(12) United States Patent
Van Brocklin et al.

(10) Patent No.: US 7,184,199 B2
(45) Date of Patent: Feb. 27, 2007

(54) PHASE CHANGE ELECTROPHORETIC IMAGING FOR REWRITABLE APPLICATIONS

(75) Inventors: Andrew L. Van Brocklin, Corvallis, OR (US); William Dorogy, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 11/232,811

(22) Filed: Sep. 21, 2005

(65) Prior Publication Data

US 2006/0025499 A1 Feb. 2, 2006

Related U.S. Application Data

(62) Division of application No. 10/792,335, filed on Mar. 2, 2004, now Pat. No. 6,970,285.

(51) Int. Cl.
*G02B 26/00* (2006.01)
*G09G 3/34* (2006.01)
*G09G 3/38* (2006.01)

(52) U.S. Cl. .................. 359/296; 345/105; 345/107

(58) Field of Classification Search ................ 359/296, 359/238, 240, 253, 452, 900; 345/105, 107, 345/108, 111, 84; 204/450, 485, 490, 600; 349/2

See application file for complete search history.

(56) References Cited

U.S. PATENT DOCUMENTS

| | | | |
|---|---|---|---|
| 5,389,945 A | 2/1995 | Sheridon | |
| 6,017,584 A | 1/2000 | Albert et al. | |
| 6,045,955 A | 4/2000 | Vincent | |
| 6,067,185 A | 5/2000 | Albert et al. | |
| 6,118,426 A | 9/2000 | Albert et al. | |
| 6,120,588 A | 9/2000 | Jacobson | |
| 6,120,839 A | 9/2000 | Comiskey et al. | |
| 6,124,851 A | 9/2000 | Jacobson | |
| 6,130,774 A | 10/2000 | Albert et al. | |
| 6,172,798 B1 | 1/2001 | Albert et al. | |
| 6,249,271 B1 | 6/2001 | Albert et al. | |
| 6,262,706 B1 | 7/2001 | Albert et al. | |
| 6,262,833 B1 | 7/2001 | Loxley et al. | |
| 6,300,932 B1 | 10/2001 | Albert | |
| 6,312,304 B1 | 11/2001 | Duthaler et al. | |
| 6,323,989 B1 | 11/2001 | Jacobson et al. | |
| 6,327,072 B1 | 12/2001 | Comiskey et al. | |
| 6,330,054 B1 | 12/2001 | Ikami | |
| 6,337,761 B1 | 1/2002 | Rogers et al. | |
| 6,373,461 B1 | 4/2002 | Hasegawa et al. | |
| 6,376,828 B1 | 4/2002 | Comiskey | |
| 6,377,387 B1 | 4/2002 | Duthaler et al. | |
| 6,380,922 B1 | 4/2002 | Lynch et al. | |
| 6,392,785 B1 | 5/2002 | Albert et al. | |

(Continued)

*Primary Examiner*—Ricky Mack
*Assistant Examiner*—Jack Dinh

(57) ABSTRACT

The present invention relates to a microcapsule that can be used to form a rewritable medium for visual displays that are stable in the presence of electric fields having a strength that is typical in the work environment. The microcapsule of the invention comprises charged particles of one or more colors that are suspended in a phase change material that has a melting temperature in the range of between about 30° C. and about 200° C. The microcapsules can be used to form an electrophoretic coating that includes microcapsules of the invention distributed throughout a polymer matrix. The electrophoretic coating can be used to coat a substrate to form a rewritable medium.

12 Claims, 3 Drawing Sheets

U.S. PATENT DOCUMENTS

| | | |
|---|---|---|
| 6,422,687 B1 | 7/2002 | Jacobson |
| 6,445,374 B2 | 9/2002 | Albert et al. |
| 6,445,489 B1 | 9/2002 | Jacobson et al. |
| 6,456,272 B1 | 9/2002 | Howard et al. |
| 6,459,418 B1 | 10/2002 | Comiskey et al. |
| 6,473,072 B1 | 10/2002 | Comiskey et al. |
| 6,504,524 B1 | 1/2003 | Gates et al. |
| 6,512,354 B2 | 1/2003 | Jacobson et al. |
| 6,515,649 B1 | 2/2003 | Albert et al. |
| 6,517,618 B2 | 2/2003 | Foucher et al. |
| 6,525,136 B1 | 2/2003 | Foucher et al. |
| 6,531,997 B1 | 3/2003 | Gates et al. |
| 6,538,801 B2 | 3/2003 | Jacobson et al. |
| 6,549,327 B2 | 4/2003 | Foucher et al. |
| 6,577,433 B1 | 6/2003 | Lin et al. |
| 6,580,545 B2 | 6/2003 | Morrison et al. |
| 2002/0075420 A1 | 6/2002 | Zhang et al. |
| 2002/0075557 A1 | 6/2002 | Zhang et al. |

PHASE CHANGE ELECTROPHORETIC IMAGING FOR REWRITABLE APPLICATIONS

This is a division of application Ser. No. 10/792,335 filed Mar. 2, 2004 now U.S. Pat. No. 6,970,285.

BACKGROUND

Flexible displays made with a technology known as electronic ink, or E ink, exhibit good brightness and contrast, a wide viewing angle and little or no power consumption are currently being exploited for applications in which a portable reusable display medium is necessary, such as in reusable paper. One way to make a reusable medium that is portable is to remove the driving electronic from the electronic display and use external addressing electrodes to write and erase images.

Generally, an encapsulated electrophoretic display includes one or more species of particles that either absorb or scatter light. One example is a system in which the capsules contain one or more species of electrophoretically mobile particles dispersed in a dyed suspending medium. Another example is a system in which the capsules contain two separate species of particles suspended in a clear suspending fluid, in which one of the species of particles absorbs light (black), while the other species of particles scatters light (white). Other extensions are possible, including more than two species of particles, with or without a dye, etc. The particles are commonly solid pigments, dyed particles, or pigment/polymer composites.

The gyricon, also called the twisting-ball display, rotary ball display, particle display, dipolar particle light valve, etc., offers a technology for making a form of electric paper. A gyricon is an addressable display made up of a multiplicity of optically anisotropic balls, each of which can be selectively rotated to present a desired face to an observer. Thus, in one version at least, the gyricon is a solid microsphere, hemispherically-colored black and white and having hemispherically-opposing zeta potentials. Each gyricon rotates within a dielectric oil-filled microcavity formed in the media upon exposure to an externally-applied electric field.

Unfortunately, currently available portable reusable displays suffer from problems with long term stability and can be destabilized by an electric field or even by static charge that builds up during normal handling. Therefore, in order to make portable reusable displays more reliable and convenient to use, it would be desirable to have a portable reusable display medium that is stable in the presence of an electric field and, in particular, is not destabilized by electrostatic discharge.

SUMMARY

The present invention relates to a microcapsule that can be used to form a rewritable medium for visual displays that are stable in the presence of electric fields having a strength that is typical in the work environment, and, in particular, the rewritable medium of the invention is stable to electrostatic discharge. The microcapsule of the invention comprises charged particles of one or more colors that are suspended in a phase change material. The phase change material has a melting temperature in the range of between about 30° C. and about 200° C. The microcapsules can be used to form a rewritable medium comprising an electrophoretic coating on a substrate. The electrophoretic coating includes microcapsules of the invention that are distributed, preferably uniformly, throughout the polymer matrix. In one embodiment, the microcapsules have at least two particles and particles of one or more colors have a positive charge and particles having one or more different colors have a negative charge.

An image can be formed on a rewritable medium of the invention using an apparatus that includes a heating element, at least one electrode, a means for positioning the heating element to heat a section of the electrophoretic coating, and a means for positioning the electrode above the surface of the section of the electrophoretic coating that is being heated or has been heated by the heating element.

DESCRIPTION OF CERTAIN PREFERRED EMBODIMENTS

Figure 1A:
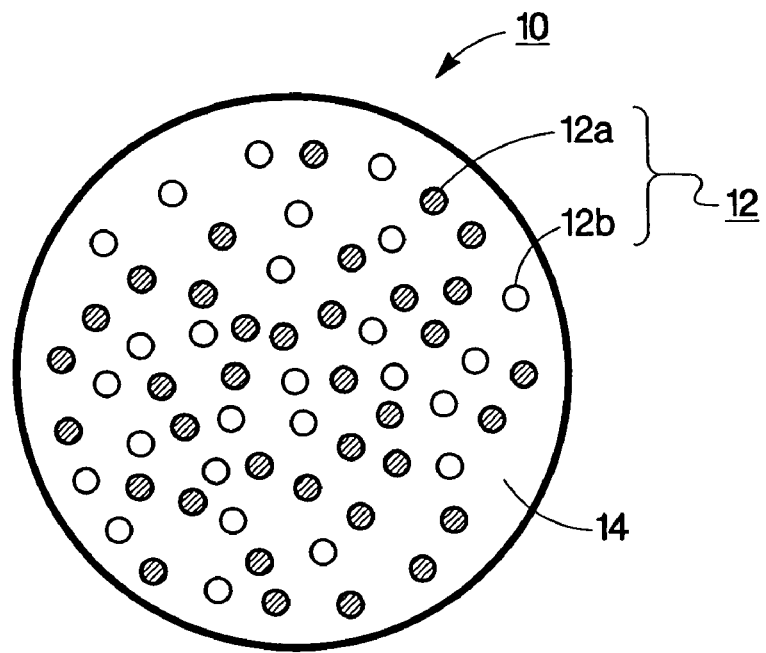
FIG. 1A is a schematic representation of an embodiment of the invention with a microcapsule of the inveintion after the phase change medium has been liquefied by heating but before an electric field has been applied.

The invention will now be described with particular reference to certain preferred embodiments of the microcapsules and rewritable medium of the invention.

The present invention relates to a microcapsule that can be used to form a rewritable medium for visual displays that are stable in the presence of electric fields having a strength that is typical in the work environment. The microcapsule of the invention comprises charged particles of one or more colors that are suspended in a phase change material that has a melting temperature in the range of between about 30° C. and about 200° C. In one embodiment, the phase change material has a melting point in the range of between about 60° and about 100° C. The microcapsules can be used to form an electrophoretic coating that includes microcapsules of the invention distributed, preferably uniformly, throughout a polymer matrix. The electrophoretic coating can be used to coat a substrate to form a rewritable medium. The substrate may be any solid material, such as a plastic or paper, provided that the substrate does not melt or decompose at a temperature needed to melt the phase change material.

The choice of particles for use in the microcapsules of the rewritable medium of the invention is not restrictive. However, the particles should not be soluble in the phase change material. The term "charged particles," as used herein, refers to particles that are charged or capable of acquiring a charge (i.e., has or is capable of acquiring electrophoretic mobility). In one embodiment, the particles are coated with a surfactant thereby adding a surface charge to the particles. Particles may be neat pigments, dyed (laked) pigments or pigment/polymer composites, or any other component that is charged or capable of acquiring a charge. Typical considerations for the electrophoretic particle are its optical properties, electrical properties, and surface chemistry. The particles may be organic or inorganic compounds, and they may either absorb light or scatter light. Particles useful in the rewritable medium of the invention may further include scattering pigments, absorbing pigments and luminescent particles. Particles may be retroreflective, such as corner cubes, or they may be electroluminescent, such as zinc sulfide particles, which emit light when excited by an AC field, or they may be photoluminescent. In one embodiment, particles are surface treated so as to improve charging or interaction with a charging agent, or to improve dispersibility.

In one embodiment, particles useful in the rewritable medium of the invention are titania. Titania particles may be coated with a metal oxide, such as aluminum oxide or silicon oxide, for example. Titania particles may have one, two, or more layers of metal-oxide coating. For example, a titania particle for use in rewritable medium of the invention may have a coating of aluminum oxide and a coating of silicon oxide. The coatings may be added to the particle in any order. Other useful particles include barium sulfate, kaolin, zinc oxide and carbon black.

The electrophoretic particle is usually a pigment, a polymer, a laked pigment, or some combination of the above. A neat pigment can be any pigment, and, usually for a light colored particle, pigments such as, for example, rutile (titania), anatase (titania), barium sulfate, kaolin, or zinc oxide are useful. Some typical particles have high refractive indices, high scattering coefficients, and low absorption coefficients. Other particles are absorptive, such as carbon black or colored pigments used in paints and inks. The pigment should also be insoluble in the liquefied phase change material. Yellow pigments such as diarylide yellow, hansa yellow, and benzidine yellow are also useful for the particles of the invention. Any other reflective material can be employed for a light colored particle, including metallic particles.

Useful neat pigments include, but are not limited to, $PbCrO_4$, Cyan blue GT 55-3295 (American Cyanamid Company, Wayne, N.J.), Cibacron Black BG (Ciba Company, Inc., Newport, Del.), Cibacron Turquoise Blue G (Ciba), Cibalon Black BGL (Ciba), Orasol Black BRG (Ciba), Orasol Black RBL (Ciba), Acetamine Black, CBS (E. I. du Pont de Nemours and Company, Inc., Wilmington, Del.), Crocein Scarlet N Ex (du Pont), Fiber Black VF (duPont), Solvent Black 17, Nirosine Base No. 424 (duPont), Solvent Black 16, Rotalin Black RM (duPont), Sevron Brilliant Red 3 B (duPont); Basic Black DSC (Dye Specialties, Inc.), Hectolene Black (Dye Specialties, Inc.), Solvent Blue 9, Solvent Green 2, Azosol Fast Brilliant Red B (GAF), Solvent Orange 20, Azosol Fast Yellow GRA Conc. (GAF), Basic Black KMPA (GAF), Benzofix Black CW-CF (GAF), Disperse Black 9, Disperse Blue 9, Basic Black3, Diamine Black CAP Ex Conc (GAF), Diamond Black EAN Hi Con. CF (GAF), Diamond Black PBBA Ex (GAF); Direct Deep Black EA Ex CF (GAF), Hansa Yellow G (GAF); Indanthrene Black BBK Powd. (GAF), Indocarbon CLGS Conc. CF (GAF), Katigen Deep Black NND Hi Conc. CF (GAF), Rapidogen Black 3 G (GAF) (Azoic Blk. 4); Sulphone Cyanine Black BA-CF (GAF), Zambezi Black VD Ex Conc. (GAF); Rubanox Red CP-1495 (The Sherwin-Williams Company, Cleveland, Ohio); Raven 11 (Columbian Carbon Company, Atlanta, Ga.),, Statex B-12 (Columbian Carbon Co.), and chrome green.

Particles may also include laked, or dyed, pigments. Laked pigments are particles that have a dye precipitated on them or which are stained. Lakes are metal salts of readily soluble anionic dyes. These are dyes of azo, triphenyl-methane or anthraquinone structure containing one or more sulphonic or carboxylic acid groupings. They are usually precipitated by a calcium, barium or aluminum salt onto a substrate. Typical examples are peacock blue lake (Cl Pigment Blue 24) and Persian orange (lake of Cl Acid Orange 7).

A dark particle may be constructed from any light absorbing material, such as carbon black, or inorganic black materials. The dark material may also be selectively absorbing. For example, a dark green pigment may be used. Black particles may also be formed by staining lattices with metal oxides, such latex copolymers consisting of any of butadiene, styrene, isoprene, methacrylic acid, methyl methacrylate, acrylonitrile, vinyl chloride, acrylic acid, sodium styrene sulfonate, vinyl acetate, chlorostyrene, dimethylaminopropylmethacryl-amide, isocyanoethyl methacrylate and N-(isobutoxymethacrylamide), and optionally including conjugated diene compounds such as diacrylate, triacrylate, dimethylacrylate and trimethacrylate. Black particles may also be formed by a dispersion polymerization technique.

In the systems containing pigments and polymers, the pigments and polymers may form multiple domains within the electrophoretic particle, or be aggregates of smaller pigment/polymer combined particles. Alternatively, a central pigment core may be surrounded by a polymer shell. The pigment, polymer, or both can contain a dye. The optical purpose of the particle may be to scatter light, absorb light, or both. The density of the electrophoretic particle may be substantially matched to that of the phase change material in the liquid state. As defined herein, a phase change material has a density that is "substantially matched" to the density of the particle if the difference in their respective densities is between about zero and about two g/ml. This difference is preferably between about zero and about 0.5 g/ml.

Useful polymers for the particles include, but are not limited to: polystyrene, polyethylene, polypropylene, phenolic resins, Du Pont Elvax resins, ethylene-vinyl acetate copolymers, polyesters, polyacrylates, polymethacrylates, ethylene acrylic acid, methacrylic acid copolymers, Nucrel Resins—Dupont, Primacor Resins—Dow Chemical, acrylic copolymers and terpolymers (Elvacite Resins, DuPont) and PMMA. Useful materials for homopolymer/pigment phase separation in high shear melt include, but are not limited to, polyethylene, polypropylene, polymethylmethacrylate, polyisobutylmethacrylate, polystyrene, polybutadiene, polyisoprene, polyisobutylene, polylauryl methacrylate, polystearyl methacrylate, polyisobornyl methacrylate, poly-t-butyl methacrylate, polyethyl methacrylate, polymethyl acrylate, polyethyl acrylate, polyacrylonitrile, and copolymers of two or more of these materials. Some useful pigment/polymer complexes that are commercially available include, but are not limited to, Process Magenta PM 1776 (Magruder Color Company, Inc., Elizabeth, N.J.), Methyl Violet PMA VM6223 (Magruder Color Company, Inc., Elizabeth, N.J.), and Naphthol FGR RF6257 (Magruder Color Company, Inc., Elizabeth, N.J.).

The pigment-polymer composite may be formed by a physical process, (e.g., attrition or ball milling), a chemical process (e.g., microencapsulation or dispersion polymerization), or any other process known in the art of particle production. From the following non-limiting examples, it may be seen that the processes and materials for both the fabrication of particles and the charging thereof are generally derived from the art of liquid toner, or liquid immersion development. Thus, any of the known processes from liquid development are particularly, but not exclusively, relevant.

Typical manufacturing techniques for particles are drawn from the liquid toner and other arts and include ball milling, attrition, jet milling, etc. These methods are described in U.S. Pat. No. 6,067,185, the entire teachings of which are incorporated herein by reference.

Chemical processes such as dispersion polymerization, mini- or micro-emulsion polymerization, suspension polymerization precipitation, phase separation, solvent evaporation, in situ polymerization, seeded emulsion polymerization, or any process which falls under the general category of microencapsulation may be used. A typical process of this type is a phase separation process wherein a dissolved polymeric material is precipitated out of solution onto a dispersed pigment surface through solvent dilution, evaporation, or a thermal change. Other processes include chemical means for staining polymeric lattices, for example with metal oxides or dyes.

Microcapsules containing the phase change material and charged particles can be made by any desired or suitable process. For example, methods for preparing microcapsules are disclosed in, for example, U.S. Pat. Nos. 4,087,376, 4,001,140, 4,273,672, 5,961,804, 2,800,457, 5,604,027. Other methods of preparing microcapsule having charged particles include U.S. Pat. Nos. 2,800,457 and 2,800,458 which disclose a phase separation method of forming microcapsules from an aqueous solution; Japanese Patent Publication Nos. 38-19574, 42-446, and 42-771 which disclose an interfacial polymerization method of forming microcapsules; Japanese Patent Publication No. 36-9168 and Japanese Patent Application Laid-Open No. 51-9079 which disclose an insitu method of forming microcapsules based on monomer polymerization; and British Patent Nos. 952807 and 965074 which disclose a dissolution dispersion cooling method of forming microcapsules. The entire teachings of the above patents and published patent applications are incorporated herein by reference. However, other methods known to those skilled in the art of forming microcapsules having charged particles may be used.

The phase change material may be directly dispersed or emulsified into the polymer matrix (or a precursor to the polymer matrix) to form an electrophoretic coating. In such a coating, the individual electrophoretic phase change droplets dispersed in the polymer matrix may be referred to as capsules or microcapsules even though no capsule membrane is present.

Alternatively, the microcapsules of the invention may be encapsulated in material that forms an outer wall around the phase change material, provided that the material can transmit sufficient light. The material for forming the outer wall of the microcapsule can be any material provided it is usable to produce the outer wall by means of a method for producing microcapsules known in the art. Preferred materials are optically transparent polymeric materials. In addition, the material that forms the outer wall of the microcapsule preferably has sufficient thermal stability so that it does not melt or degrade under temperatures wherein the phase change material is a liquid. Examples of suitable materials for the outer wall of microcapsules of the invention include polyvinyl alcohol, polyethylene, polyamide, polyester, polyurethane, polyurea, polyurethane, polystyrene, nitrocellulose, ethylcellulose, methylcellulose, melamine/formaldehyde resin, urea/formaldehyde resin, and copolymers thereof.

It is preferable that the volume of particles in the microcapsule carrying a positive or negative charge is in the range of between about 0.1% and about 20% of the total volume of the microcapsule. In addition, it is preferable that the total sum volume of all of the charged particles is in the range of between about 0.1% and about 40% of the total volume of the microcapsule. In some embodiments, the total sum volume of all of the charged particles is in the range of between about 0.1% and about 20%, about 5% and about 15%, and about 9% and about 11% of the total volume of the microcapsule. If the volume of the charged particles is lower than 0.1% of the total volume of the microcapsule, the contrast of the image is lower because the eye of the observer may be able to distinguish oppositely charged particles that have a different color. However, movement of the particles is excessively impeded if the total volume of the particles exceeds 40% or the volume of the set of particles that are positively charged or the set of particles that are negatively charged exceeds 20% resulting in reduced performance of the rewritable medium in response to application of an electric field.

The diameter of the charged particle is preferably is in the range of between about 10 nm to about 5 µm, as long as the particles are smaller than the microcapsules. The diameter of the microcapsule is preferably is in the range of between about 5 µm to about 400 µm.

The polymer matrix is typically a transparent or translucent material. Selection of the polymer matrix is dependent on what phase change material is used in the microcapsules since the polymer matrix must have a melting temperature that is higher than the phase change material. In addition, the polymer matrix should not substantially degrade at the melting temperature of the phase change material. Examples of suitable materials for the polymer matrix include elastomers, such as SYLGARD® 184, available from Dow Corning, Midland, Mich., Stauffer and Wacker V-53 elastomer; acrylics; polyvinylalcohols; polyvinylacetates; polyurethanes; polysaccharides, including cellulose and cellulose derivatives; gelatin arabic; gum arabic; polyamides; urea-formaldehyde resins; melamine-formaldehyde resins; N-methyl pyrrolidone; N-vinyl pyrrolidone; poly-2-hydroxyethylacrylate; latex compositions, typified by the Neorez® and Neocryl® resins (Zeneca Resins), Acrysol® (Rohm and Haas), Bayhydrol® (Bayer), and the Cytec Industries HP line, including lattices of polyurethanes, occasionally compounded with one or more of the acrylics, polyesters, polycarbonates or silicones; epoxies; polyesters; and the like, as well as mixtures thereof. After the microcapsules have been dispersed within the precursor of the polymer matrix, the precursor is cured by any desired or effective method, such as application of heat, radiation (such as UV-radiation), chemical curing, or the like. One example of a specific process for providing electrophoretic microcapsules dispersed within a polymer matrix is disclosed in U.S. Pat. No. 6,067,185, the entire teachings of which are incorporated herein by reference.

The phase change material can be any material that has a melting point in the range of between about 30° C. and 200° C. Preferably, the phase change material has a melting point in the range of between about 60° C. and about 100° C. Examples of useful phase change materials include paraffin wax (melting point of about 65° C. to about 80° C.), 1-docosanol (melting point of about 65° C. to about 72° C.), 1-hexacosanol (melting point of about 80° C.), n-tetratetracontane (melting point of about 86° C.), 1-triacontanol (melting point of about 88° C. to about 90° C.), and n-pencontane (melting point of about 94° C.). Preferred properties for phase change materials are shown in Table 1.

TABLE I

Preferred properties for phase change materials.

| Property | Preferred Value |
| --- | --- |
| Density | Similar density to dispersed particles |
| Refractive Index | <1.2 |
| Refractive Index Difference | <0.3 (more preferably about 0.05 to about 0.2) |
| Dielectric Constant | About 2 |
| Volume Resistivity | About $10^{15}$ ohm-cm |
| Viscosity as a Liquid | 5 cst |
| Toxicity | Low |
| Water Solubility | <10 ppm |
| Specific Gravity | >1.5 |
| Melting Point | about 60° C. to about 100° C. |

In one embodiment, a material that absorbs infrared radiation may be dispersed throughout the phase change material in order to facilitate quickly heating the phase change material to above its melting point. In one embodiment, (2-[2-[2-chloro-3-[(1, 3-dihydro-3,3-dimethyl-1-propyl-2H-indol-2-ylidene) ethylidene]-1-cyclohexen-1-yl] ethenyl]-3,3-dimethyl-1-propylindolium iodide), a dye that absorbs infrared radiation, is dispersed throughout the phase change material.

During or after application of sufficient heat to a section of the electrophoretic coat to cause the phase change material in the microcapsules to melt, an electric field is applied to the electrophoretic coat. The electric field gradient is preferably approximately perpendicular to the surface of the electrophoretic coating. However, other orientations of the electric field are possible.

Figure 1B:
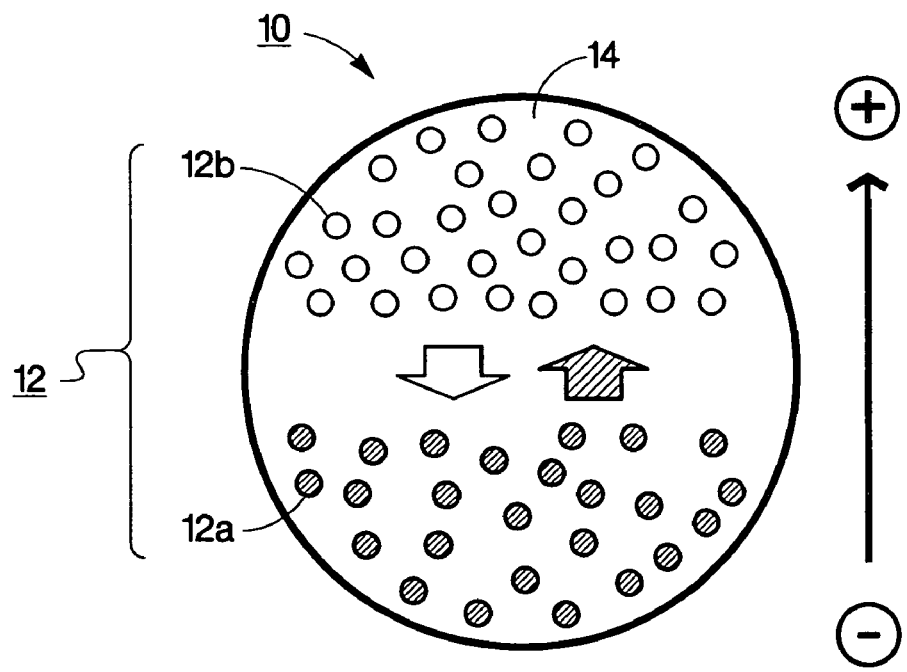
FIG. 1B is a schematic representation of an embodiment of the invention with the microcapsule of FIG. 1A after an electric field has been applied.

In one embodiment, the microcapsules of the electrophoretic coating have charged particles of at least two colors. In this embodiment, particles having one or more colors have a positive charge and particles having one or more different colors have a negative charge. For example, microcapsules may contain negatively charged black particles and positively charged white particles. In this example, the effect of application of an electric field to a microcapsule 10 in an electrophoretic coating that has been heated to a temperature that is high enough to liquefy the phase change material will be explained with reference to FIGS. 1A and 1B. When the electric field is not exerted, the negatively charged black particles 12a and the positively charged white particles 12b are dispersed randomly or in a disordered manner throughout the phase change material 14, as shown in FIG. 1A. When the electric field is applied to the electrophoretic coating in a direction, for example, perpendicular to the surface of the electrophoretic coating as shown in FIG. 1B, the negatively charged black particles 12a and the positively charged white particles 12b move in opposite directions under the influence of the electric field causing the black particles to accumulate on one side of the microparticle closest to the positively charged electrode and the white particles to accumulate on the other side of the microparticle closest to the negatively charged electrode.

The section of the electrophoretic coating is then allowed to cool while continuing the application of the electric field or shortly after discontinuation of the electric field so that the phase change material solidifies, trapping the black particles at one side of the microcapsule and the white particles at the other side of the microcapsule. When the microcapsule is viewed from above the surface of the electrophoretic coating, the black particles, which are gathered on the lower side, cannot be seen because they are hidden by the white particles. Therefore, the observer will see this section of the rewritable medium as white. If an electric field is applied in the opposite direction (i.e., the positive and the negative electrodes are reversed), the section of the rewritable medium would be seen as black. Therefore, a predetermined image can be formed on the rewritable medium by applying heat and changing the direction of the electric field in different sections of the rewritable medium.

In a preferred embodiment of the invention, a multi-color, electrophoretic display is contemplated. In this embodiment, an electrophoretic coating comprises a polymer matrix that has microcapsules that have at least two, and preferably at least three, species of particles in the phase change material. These particles are of different colors and possess substantially non-overlapping electrophoretic mobilities. As used herein, the phrase "substantially non-overlapping electrophoretic mobilities" means that less than 25%, and preferably less than 5%, of the particles of different colors have the same or similar electrophoretic mobilities. As an example, in a system having two species of particles, less than 25% of particles of one species would have the same or similar electrophoretic mobilities as the particles in the other species.

In an alternative embodiment, one of the colors may be represented by a dye dispersed in the phase change material. In this embodiment, the particles may, for example, all have either a positive charge or all have a negative charge. When the electric field is applied in a direction that draws the particles towards the surface of the electrophoretic coating, the section of the electrophoretic coating will appear to a viewer to be the color of the particles. When the electric field is applied in a direction that draws the particles away from the surface of the electrophoretic coating, the section of the electrophoretic coating will appear to a viewer to be the color of the dye. In this embodiment, the phase change material is preferably not transparent when the phase change material is a solid.

When the electrophoretic coating of the invention is used to form a colored image, the particles of a particular color have a different zeta potential, and hence a different electrophoretic mobility, than particles having a different color. For example, each microcapsule can contain red particles with an average zeta potential of 100 mV, green particles with an average zeta potential of 60 mV, and blue particles with an average zeta potential of 20 mV. To address a section of the electrophoretic coating to the red state, the phase change material in the microcapsule is melted and all the particles in the microcapsules are pulled away from the surface of the electrophoretic coating by applying an electric field in one direction. Subsequently, the field is reversed for just long enough for the red particles in the microcapsules to move toward the side of the microcapsule that faces the surface of the electrophoretic coating. The green and blue particles will also move in this reversed field, but they will not move as quickly as the red particles, and thus will be obscured by the red particles.

To address a section of the electrophoretic coating to the green state, all the particles in the microcapsules are pulled away from the surface of the electrophoretic coating by applying an electric field in one direction. Then the field is reversed for just long enough for the red and green particles to move to the side of the microcapsule facing the surface of the electrophoretic coating. The field is then reversed again and the red particles, moving faster than the green particles, leave the green particles exposed at the side of the microcapsule facing the surface of the electrophoretic display.

Finally, to achieve a blue display, all the particles are pulled toward the side of the microcapsule that faces the surface of the electrophoretic coating. The field is then reversed and the blue particles, lagging behind the red and green particles are exposed on the side of the microcapsule that faces the surface of the electrophoretic coating.

When forming a colored display, one of the colors optionally may be represented by a dye dispersed in the phase change material. In this embodiment, the phase change material is preferably not transparent when it is a solid.

Once the electrophoretic coating has cooled enough for the phase change material to solidify, the image which has been displayed on the rewritable medium is maintained as it is even after the application of the voltage is stopped and is not erased or disrupted by the presence of an electric field, electrostatic discharge, or normal electric charges that can build up during handling of the rewritable medium. The image can be written over and a different image can be generated by heating different sections of the electrophoretic coating and applying an electric field to each section such that the direction of the electric field gradient in the section of the electrophoretic medium has a different pattern than that of the first image. To erase the image so that the rewritable medium has one uniform color, the entire rewritable medium is heated above the melting point of the phase change material and a uniform electric field is applied to the entire electrophoretic coating so that each of the microcapsules in the electrophoretic coating experiences an electric field having about the same strength and in the about the same direction. Alternatively, an image can be erased by heating sections of the electrophoretic coating separately and applying an electric field to each of the sections individually or line by line, provided that the electric field applied to each section is about the same strength and is applied in about the same direction for about the same length of time.

The strength of the electric field needed to address a section of the electrophoretic coating depends on a number of factors including the time period in which the electric field is applied to a section of the electrophoretic coating, the viscosity of the liquefied phase change material and the type and charge of particles in the microcapsules. The period of time for which the electric field is applied is typically in the range of about 0.1 millisecond to about 10 seconds. More typically, the electric field is applied for about 1 millisecond to about 1 second. As the strength of the electric field is increased, the period of time that the electrophoretic coating needs to be in the electric field to cause the desired migration of the charged particle is decreased.

Figure 2A:
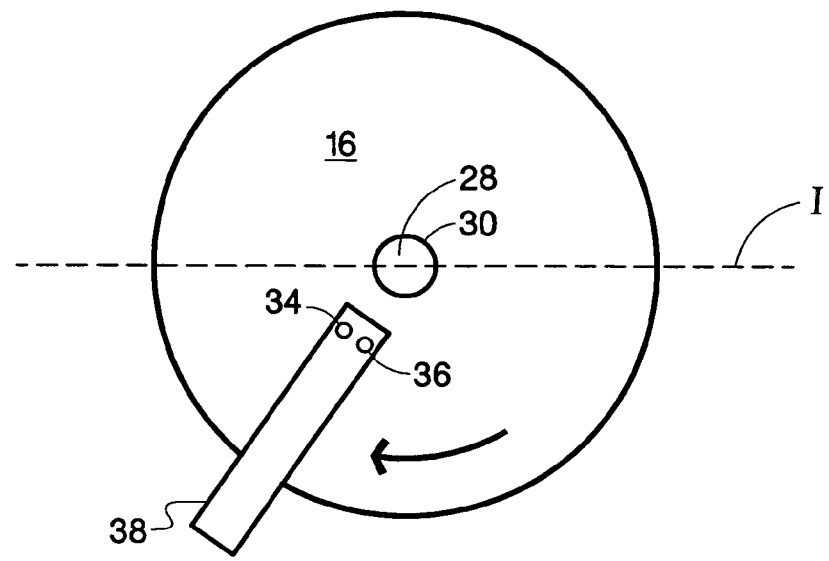
FIG. 2A is a schematic representation of one embodiment of the invention with an apparatus for forming an image on a CD or DVD having a rewritable electrophoretic coating.
Figure 2B:
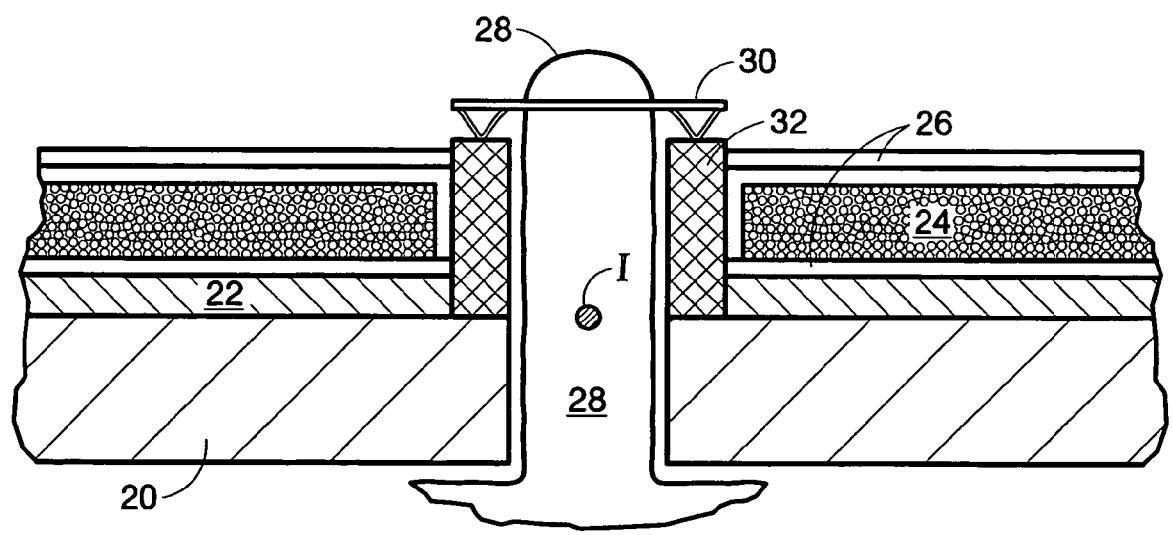
FIG. 2B is a cross-sectional view along line (I) of the CD or DVD in the apparatus of FIG. 2A according to an embodiment of the invention.

FIG. 2A shows a schematic illustration of a CD or DVD 16 in an embodiment of an apparatus for forming or erasing an image on a rewritable medium. FIG. 2B is a cross-section of the CD or DVD 16 and the apparatus along line (I). The CD or DVD 16 has a polycarbonate substrate 20 with a metal layer 22 on one side of the substrate 20. The electrophoretic coating 24 is on top of the metal layer 22 and can be encapsulated in a protective coating 26. The metal layer 22 is connected to one terminal of a power source (not shown) through a spindle 28 that is in contact with a drive ring 30. The drive ring 30 is in contact with a metal contact 32 that in turn is in contact with the metal layer 22. A positive or negative charge can be applied to the metal layer 22 through the spindle 28 which is in contact with the power source. The apparatus has an arm 38 that includes a heating element 36 and one or more point electrodes 34 that are connected to the other terminal of the power source. The point electrodes can be touching the surface of the electrophoretic coating or suspended in close proximity to the electrophoretic coating. The power source is capable of switching the charge at each terminal when the electric field is moved to a different section of the electrophoretic coat. Thus, data regarding each pixel of an image can be stored in a data storage device and used to control the pixel color at a particular pixel location by controlling the direction of the electric field applied to that pixel. The spindle 28 can rotate the disc at a substantially uniform speed so that the electrophoretic coating is transported into an area that is heated by the heating element and heated to a sufficient temperature to liquefy the phase change material in the microcapsules of the electrophoretic coating and thereafter is transported into the electric field generated by the electrode. Alternatively, the heating element and electrodes can be positioned such that a section of the elelctrophoretic coating is heated at the same time as an electric field is applied. In another alternative embodiment, the disc remains stationary on the spindle and the arm 38 containing the heating element 36 and the electrodes 34 is moved over the disc at a substantially uniform speed.

Figure 3:
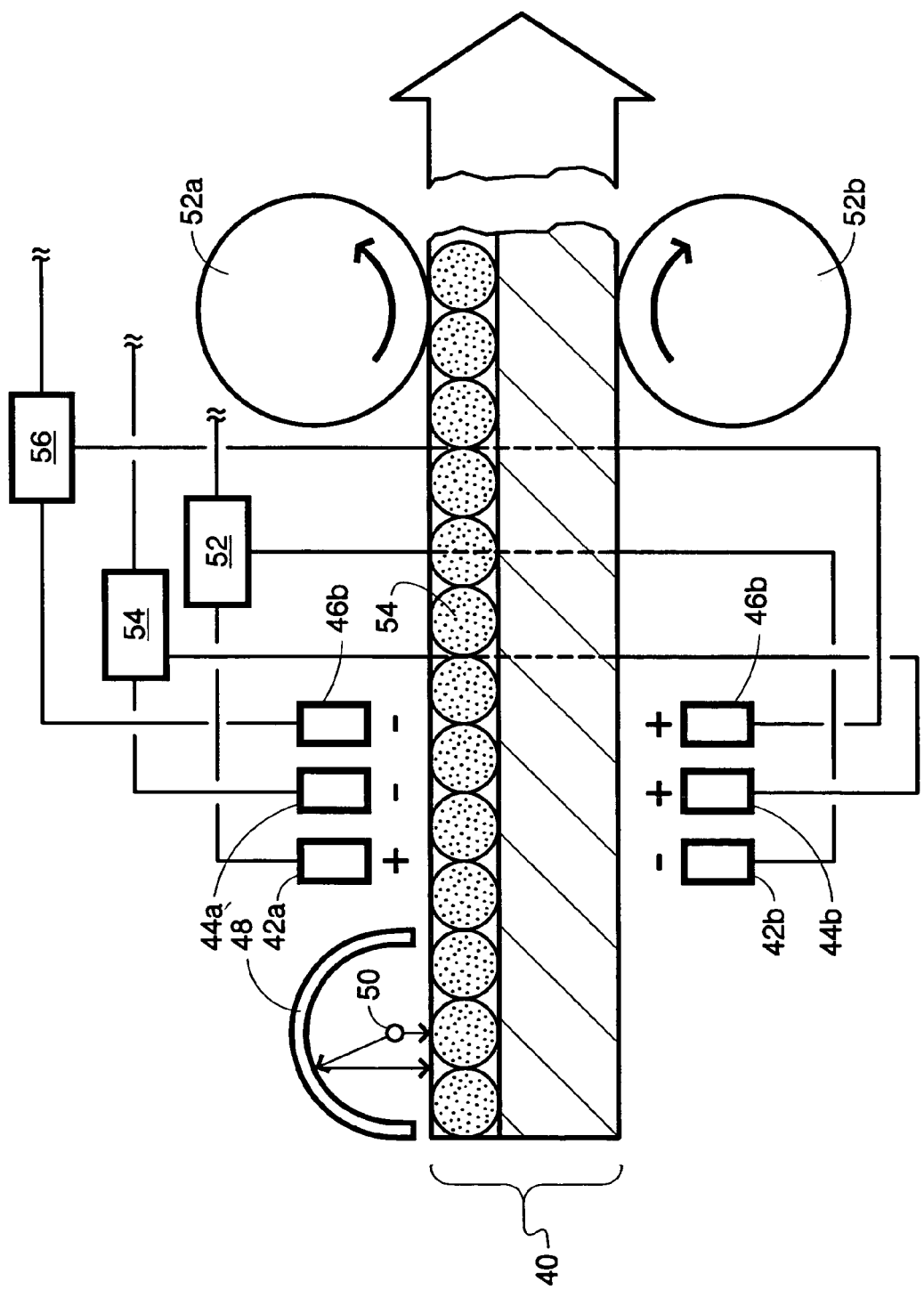
FIG. 3 is a schematic representation of one embodiment of the invention with an apparatus for forming an image on a rewritable medium having an electrophoretic coating.

FIG. 3 is a schematic representation of an alternative embodiment of an apparatus of the invention that is designed to form or erase an image on an embodiment of a rewritable medium of the invention that does not have a metal layer. In this embodiment, the apparatus includes electrode pairs 42a and 42b, 44a and 44b, and 46a and 46b that are each connected to one terminal of a power source and are aligned with each other above and below the rewritable medium 40. The apparatus also includes a IR heater 50 and a reflector 48 which is aligned with the electrode pair (42a, 42b, 44a, 44b, 46a, and 46b) such that the transport rollers 52a and 52b move the rewritable medium 40 through an area that is heated to a sufficient temperature to melt the phase change material in the microcapsules 54 by the IR heater 50 and then is transported into the electric field generated by the aligned metal plates of the electrodes (42a, 42b, 44a, 44b, 46a, and 46b). Alternatively, and infrared laser, radio frequency induction, or microwave impingement can be used to liquefy the phase change material.

In one embodiment, the apparatus for forming or erasing an image operates as follows. The rewritable medium 40 is transported by the transport unit at the constant speed in the direction indicated by the arrow in FIG. 3. At first, the rewritable medium 40 passes through a space heated by the heating element 50 sufficiently to melt the phase change material. The rewritable medium 40 then passes the electrodes 42a, 42b, 44a, 44b, 46a, and 46b which apply a directional electric field to form a predetermined image. Shortly after the applied heat is removed from the section of the electrophoretic coating, the phase change material solidifies and a constant image is maintained on the rewritable medium 40. A new image can be formed by passing the rewritable medium 40 through the apparatus of FIG. 3 again.

In one embodiment, the electrodes (42a, 42b, 44a, 44b, 46a, and 46b) may have a size approximately equivalent to the picture element, and they are capable of scanning in the vertical and lateral directions.

In another embodiment, the electric field may be generated by a line of electrodes having approximately the same width as the lateral width of the rewritable medium. The line of electrodes may be constructed such that the electric field is applied differently for each of picture elements (image pixels) in the array in the lateral direction of the rewritable medium 40.

In another alternative embodiment, the electric field may be generated by a three parallel lines of electrodes each having approximately the same width as the lateral width of the rewritable medium. In this embodiment, the particles in the microcapsules of a first row of picture elements can migrate in the electric field of the first row of electrodes. When the three rows of electrode are move down one line, the particles in the first row of picture elements then migrates in the electric field of the second row of electrodes which repeats the electric field pattern that the first row of electrodes had when addressing the first row of picture elements. When the three rows of electrode are move again move down one line, the particles in the first row of picture elements then migrates in the electric field of the third row of electrodes which, once again, repeats the electric field pattern that the first row of electrodes had when addressing the first row of picture elements. Using three rows of electrodes can thus speed up the time in which the rewritable medium passes through the apparatus to form an image.

In another alternative embodiment, a two dimensional array of electrodes can be used to form an image on the rewritable medium. In this embodiment, the entire rewritable medium is heated to a temperature sufficient to liquefy the phase change material. Then the rewritable medium is placed in the electric fields generated by the electrodes in the array and the image is formed on the entire rewritable medium in one step.

In another embodiment of the apparatus of the invention, the rewritable medium remains stationary and the heating element and electrodes for generating the electric field are capable of scanning, preferably in unison, in the vertical and/or lateral directions such the heating element heats a section of the electrophoretic coating. The electrodes used to produce the electric field are moved into position above and below a section of the rewritable medium either simultaneously with the heating element or just after the section has been heated so that they produce an electric field in that section of the rewritable medium before the phase change material can solidify.

EXAMPLES

For the purposes of illustration only,

I. Formation of Non-Encapsulated Phase Change Particle Dispersion Microcapsules

A dye or combination of dyes that are soluble in the liquid phase of the phase change material is chosen. The phase change material can be any one of the following materials: 1-doosanol, paraffin wax, 1-hexacconsanol, n-tetratetracontane, 1-tricontanol, or n-pencontane.

Titania particles with diameters between 10 nm to about 5 microns are used for dispersion in the microcapsules. The particles should be smaller than the microcapsules that are to be formed and occupy between about 0.1% and about 20% of the volume of the microcapsule.

The phase change material is heated until it liquefies and has a viscosity suitable for dispersing the particles utilizing conventional dispersion techniques, such as high speed/shear mixing or ultrasonic treatment.

An IR absorbing material is added to the liquid phase change material. The IR absorbing material can be a pure compound or mixture of compounds provided that it is soluble in the liquid phase change material. The IR absorbing material is selected such that it absorbs the IR laser radiation, converts the IR radiation into heat sufficient to melt the phase change material.

The appropriate amount of particles are added to the liquid phase change material with continued stirring at a rate sufficient to maintain a uniform dispersion.

The uniform liquid dispersion is rapidly cooled to entrap the particles within solid phase change material microcapsules by one of the following methods:

a) Spraying the hot liquid dispersion into a cold atmosphere or cold liquid, in which the phase change material is insoluble;

b) Pouring the hot liquid dispersion into a rapidly stirring cold liquid, in which the phase change material is insoluble, such that fine particles (i.e., microcapsules) are formed, collecting the solidified microcapsules, and reducing the microcapsule size using conventional grinding or milling techniques; or c) Extruding the hot liquid dispersion through an orifice such that a droplet forms, then releases and drops through a cold atmosphere that causes solidification into a microcapsule. Microcapsules can then be collected in a container or liquid medium.

After solidification of the phase change material to form microcapsules, additional grinding and milling of the microcapsules can be carried out if required to achieve the appropriate size.

II. Formation of Encapsulated Microcapsules Via Co-Extrusion

A hot liquid dispersion of particles in a phase change material is extruded through a central orifice such that a droplet forms and then another polymeric material, which has a higher melting than Phase Change Material, is extruded around the phase change material particle dispersion droplet.

The co-extruded droplet is then release and drop through a cold atmosphere causing solidification of a polymeric shell around the phase change material particle dispersion droplet.

III. Formation of Encapsulated Microcapsules Via Vapor Phase Coating

A polymeric material, such as paralene, is heated such that it decomposes into vapor of reactive gaseous fragments. The solid phase change material microcapsules prepared as in Example I are exposed to this vapor. The solid phase change material microcapsules may be tumbled in a chamber or fluidized bed techniques may be used to ensure a uniform exposure over the entire microcapsule surface. The reactive gaseous fragments will absorb on the microcapsule surface and recombine into a polymeric material that coats the microcapsule.

IV. Formation of Encapsulated Microcapsules Via Complex Coacervation

Acacia is dissolved in water with stirring at room temperature. Any insoluble material is removed by centrifuge techniques.

The purified acacia solution is transferred into a reactor vessel and heated to 40° C. The solution is then agitate using a paddle stirrer. Gelatin is added to the stirring solution such that no clumping of the solid occurs. The resulting solution is stirred for 30 minutes.

A liquid phase change material particle dispersion is added to the stirring solution, and the solution is stirred at a rate sufficient to form a uniform particle dispersion but below the rate that causes foaming. The pH is reduced to approximately 4 over several minutes using an aqueous 10% acetic acid solution. Water that has been preheated to 40° C. is added to the solution, and the temperature is reduced to 10° C. A 37% aqueous formalin solution is added, and the solution is stirred for an additional 60 minutes. Sodium carboxymethyl-cellulose is added to the solution, and the pH is increased to 10.0 by the addition of aqueous 20 wt. % sodium hydroxide. The temperature is increased to 40° C. and stirring is continued for about an hour. The resulting slurry is allowed to slowly cool overnight to ambient temperature with stirring. The coated microcapsules are collected using conventional filtration techniques.

V. Formation of Encapsulated Microcapsules Via Interfacial Polymerization

This method can be utilized only when the phase change material is paraffin wax or hydrocarbons. Phase change materials that have alcoholic groups cannot be used because they react with the acid chloride monomer.

The phase change material is heated until it liquefies with a viscosity suitable for dispersing the electrophoretic particles utilizing conventional dispersion techniques, such as high speed/shear mixing or ultrasonic treatment. Under an inert atmosphere, an alkyl diacid chloride, such as sebacoyl chloride, is added to the liquefied phase change material along with electrophoretic particles. The inert atmosphere is used to minimize potential reaction of the diacid chloride with moisture at elevated temperatures.

The liquid dispersion is rapidly cooled to entrap the electrophoretic particles within solid phase change material microcapsules by one of the following methods:

a) Spraying the hot liquid dispersion into a cold inert atmosphere or a cold liquid, in which the phase change material is insoluble and is non-reactive to the diacid chloride;

b) Pouring the hot liquid dispersion into a cold liquid, in which the phase change material is insoluble and which is non-reactive to the diacid chloride, such that fine particles (i.e., microcapsules) are formed, collecting the solid microcapsules, and reducing the microcapsule size using conventional grinding or milling techniques; or c) Extruding the hot liquid dispersion through an orifice such that a droplet forms, then releases, and drops through a cold inert atmosphere that causes solidification into a microcapsule. Microcapsules are then collected in a container or liquid medium.

Phase change particle dispersion microcapsules are added into a stirring aqueous solution containing an alkyldiamine, such as 1,6-diaminohexane. While stirring, the dispersion is heated sufficiently to melt the phase change particle dispersion microcapsules. The stirring rate is adjusted to form a uniform dispersion of suitably sized droplets. The solution is stirred and heating for about an hour. A polymer shell will form at the water/phase change material interface and eventually encapsulate the liquid phase change particle dispersion microcapsules. The slurry is cooled with stirring to ambient temperature, and the coated microcapsules are collected using conventional filtration techniques.

VI. Formation of Encapsulated Microcapsules Via In-Situ Polymerization

A dilute aqueous mixture of ethylene-co-maleic anhydride, resorcinol, and urea is formed. The mixture is stirred and the pH is quickly adjust to 3.5 using 25 wt. % sodium hydroxide. Phase change particle dispersion microcapsules are added. An aqueous 37 wt. % formaldehyde solution is added to the rapidly stirring dispersion, and the temperature is then increased to about 55° C. The temperature and stirring are maintained for several hours. The slurry is then cooled with stirring to ambient temperatures, and the encapsulated microcapsules are collected using conventional filtration techniques.

VII. Formation of Non-Encapsulated Microcapsules in a Matrix This Method Utilizes a Binder Matrix as an Encapsulation Medium.

The phase change particle dispersion microcapsules are dispersed into a binder matrix solution utilizing conventional techniques. The matrix solution (and solvent if present) is selected so that the phase change material has minimal (preferred no) solubility in it. The processing parameters are adjusted to achieve a stable and uniform matrix/microcapsule dispersion.

A substrate is coated with the above dispersion, and the dispersion is cured by standard techniques (e.g., solvent evaporation, UV-cure, condensation or free-radical polymerization, etc.). The liquefied phase change material must have minimal (preferably no) solubility in the cured matrix.

OTHER EMBODIMENTS

Other embodiments of the invention will be apparent to those skilled in the art from a consideration of the specification or practice of the invention disclosed herein. It is intended that the specification and examples be considered as exemplary only, with the true scope of the invention being indicated by the following claims.

The invention claimed is:

1. An apparatus for forming or erasing an image on the rewritable medium for visual display comprising an electrophoretic coating on a substrate, wherein the electrophoretic coating comprises microcapsules comprising charged particles of one or more colors suspended in a phase change material that has a melting temperature in the range of between about 30° C. and about 200° C., wherein particles of at least one color have a positive or a negative charge, and a polymer matrix, wherein the microcapsules are distributed in the polymer matrix comprising:

a) a heating element;
b) at least one electrode;
c) a means for positioning the heating element to heat a section of the electrophoretic coating; and
d) a means for positioning the at least one electrode above the surface of the section of the electrophoretic coating.

2. The apparatus of claim 1, wherein the at least one electrode is positioned above the surface of a section of the electrophoretic medium that is simultaneously heated by the heating element.

3. The apparatus of claim 1, wherein the heating element is positioned to heat a section of the electrophoretic medium before the at least one electrode is positioned above the surface of said section of the electrophoretic coating.

4. The apparatus of claim 1, wherein the heating element is an infrared laser, an infrared lamp, an RF induction heater, or a microwave heating device.

5. The apparatus of claim 1, wherein the rewritable medium includes a metal layer between the electrophoretic coating and the substrate; and the apparatus further comprises a power source connected to the electrode and the metal layer.

6. The apparatus of claim 1, wherein the apparatus comprises at least two electrodes each comprising a metal plate connected to a power supply, wherein one metal plate is placed above the surface of the electrophoretic coating and the other electrode is placed on the opposite side of the electrophoretic coating.

7. The apparatus of claim 1, comprising a line of electrode pairs, wherein one electrode of an electrode pair is placed below the rewritable medium and the other electrode of the electrode pair is placed above the rewritable medium.

8. The apparatus of claim 1, comprising three parallel lines of electrode pairs, wherein one electrode of an electrode pair is placed below the rewritable medium and the other electrode of the electrode pair is placed above the rewritable medium.

9. The apparatus of claim 7 or 8, wherein the means for positioning the heater and the electrode is a device that moves the heater and the electrodes horizontally or vertically over the rewritable medium.

10. The apparatus of claim 1, wherein the means for positioning the heater and the means for positioning the electrode is a means for moving the rewritable medium.

11. The apparatus of claim 10, wherein the substrate is a polycarbonate disc and the means for moving the rewritable medium is a drive ring which moves the disc.

12. The apparatus of claim 10, wherein the substrate is paper and the means for moving the rewritable medium is a transport roller.

* * * * *